Patented Jan. 18, 1938

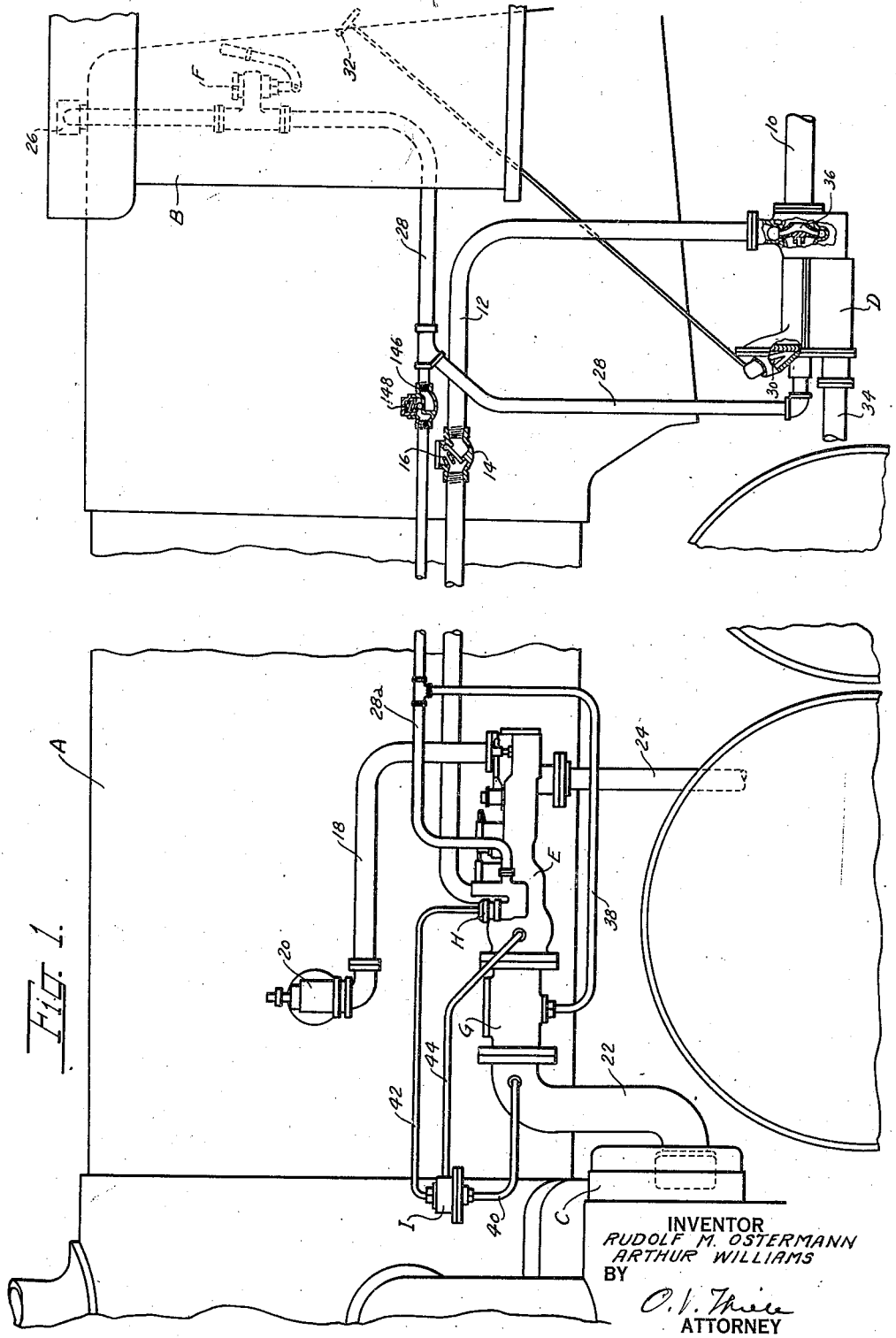

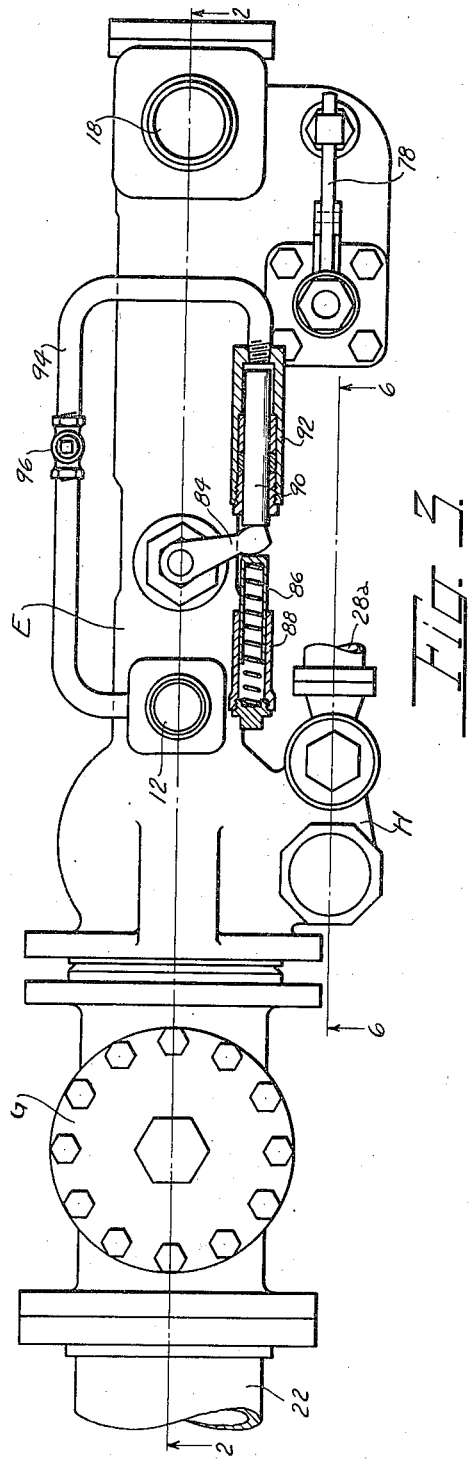
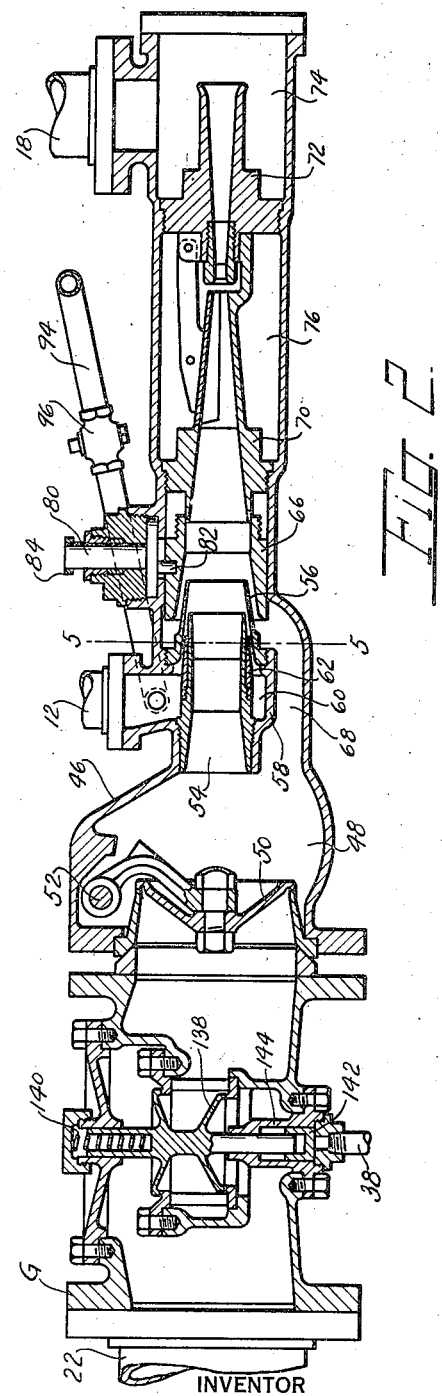

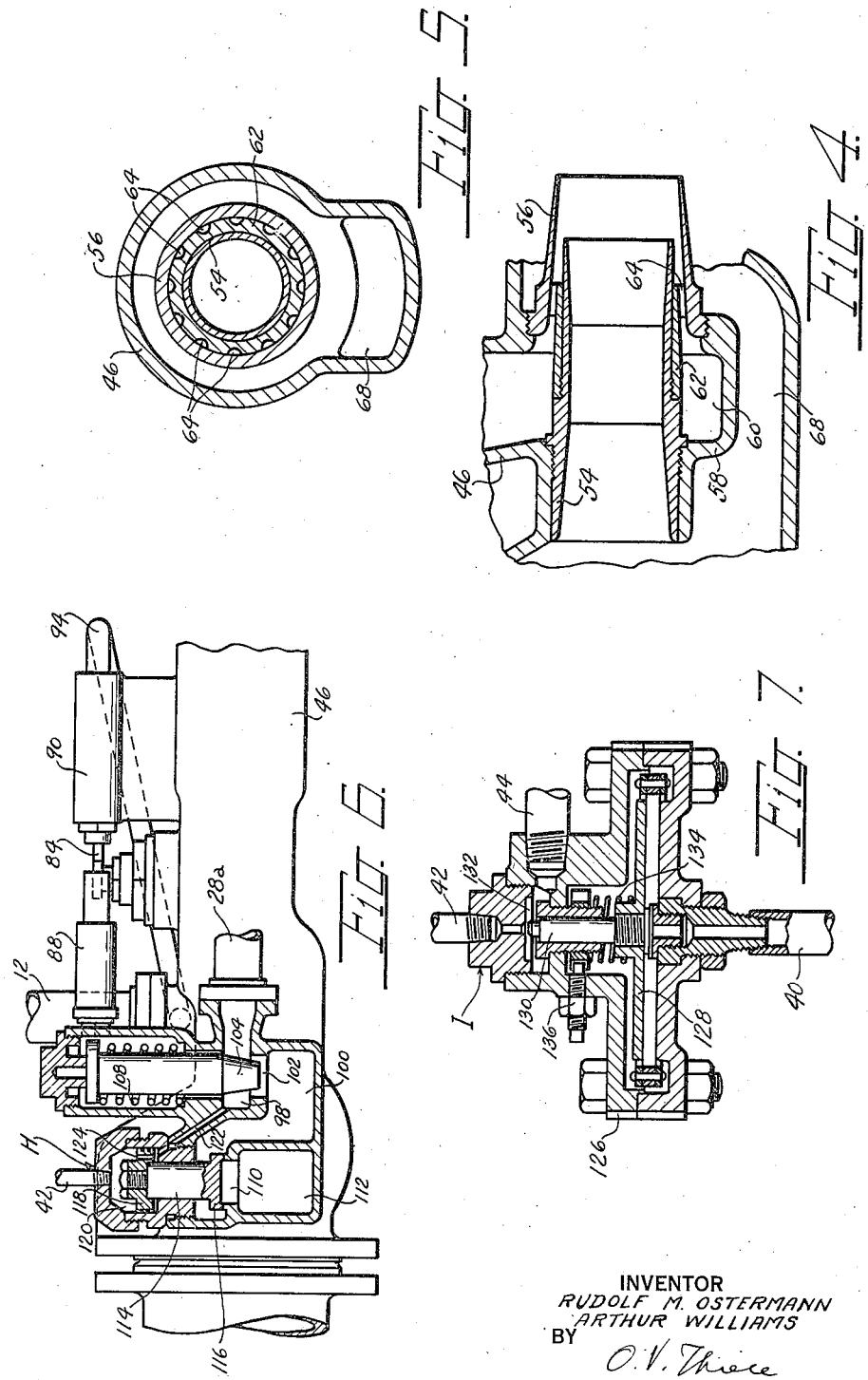

2,105,817

UNITED STATES PATENT OFFICE 2,105,817

FEED WATER HEATING SYSTEM

Rudolf M. Ostermann, Kenilworth, Ill., and Arthur Williams, Munster, Ind., assignors to The Superheater Company, New York, N. Y.

Application August 15, 1935, Serial No. 36,363

15 Claims. (Cl. 103—265)

The present invention relates to feed water heating systems for boilers and has particular reference to feed water heating systems for locomotive boilers.

In the interests of boiler efficiency, it is desirable to feed water to a boiler at as high a temperature as possible and in the case of a locomotive boiler it is also highly desirable in the interests of fuel economy to preheat the boiler feed water with heat recovered from the exhaust steam of the engine. The recovery of such heat, in the case of a locomotive, represents a net gain, for ordinarily in a locomotive the heat of the exhaust steam is wasted.

In order to recover some of the heat of the exhaust steam and to provide preheated feed water for locomotives, numerous different forms of preheating equipment have been heretofore proposed among which the most important are the systems comprising a boiler feed pump and a feed water heater, and systems comprising an exhaust steam injector, that is, an injector in which a part of the power necessary to force water to the boiler is derived from the condensation of exhaust steam.

The operating conditions affecting the operation of a locomotive boiler feed water heating system are extremely severe in that for a system of this character to be satisfactory, it is necessary for the system to be able to operate throughout a wide range of capacities and to operate with feed water which in many instances is very impure and which moreover may be supplied to the system at widely varying initial temperatures.

When operating under these severe conditions, both the pump and feed water heater systems and the exhaust steam injector systems are capable of producing commercially successful results but each of these types of systems has very definite inherent limitations which render the performance of the systems short of that which it is desirable to attain.

The principal object of the present invention is therefore to improve upon prior types of boiler feed water heating systems and to provide novel method and means for supplying, more efficiently than heretofore, feed water preheated to high temperature by the heat of exhaust steam. A further principal object of the invention is to provide an efficient feed water heating system which is more simple and rugged, and also cheaper, than systems of the kind heretofore employed which are capable of producing even approximately comparable thermal results, and which does not require periodic cleaning and other service attention required by such of the prior systems as are capable of producing such thermal results.

Other and more detailed objects of the invention together with the advantages to be derived from its use will appear as the ensuing description proceeds.

In accordance with the present invention, feed water is supplied to the boiler from an exhaust steam injector to which water is supplied under substantial pressure, and at high velocity to the condensing zone of the injector, by pumping means which is preferably in the form of a mechanical pump. Further, in accordance with the invention, the injector is of the forcing type, which not only acts to heat the feed water by condensing exhaust steam therewith but also delivers it at a pressure substantially above that at which it is received from the pumping means.

In order that the nature of the invention and the improved results obtained by its use may best be understood, a practical example of apparatus embodying the invention and illustrated in the accompanying drawings will now be described and the nature of its action explained, the scope of the invention being set forth in the appended claims.

In the drawings, Fig. 1 is a side elevation of part of a locomotive having a feed water heating system embodying the invention applied thereto;

Fig. 2 is a longitudinal central section of the exhaust steam injector shown in Fig. 1 and taken on the line 2—2 of Fig. 3;

Fig. 3 is a plan view, partly in section, of the injector shown in Fig. 2;

Fig. 4 is a section on enlarged scale of part of the nozzle structure shown in Fig. 2;

Fig. 5 is a section on enlarged scale taken on the line 5—5 of Fig. 2;

Fig. 6 is a section taken on the line 6—6 of Fig. 3; and

Fig. 7 is a section on enlarged scale of a control valve shown in Fig. 1.

Referring now more particularly to Fig. 1, the locomotive boiler is indicated generally at A, the cab of the locomotive at B and the cylinder of the engine at C.

The feed pump is indicated at D and the exhaust steam injector is indicated generally at E.

Feed water from the tender (not shown) is supplied to the pump D through the suction conduit 10 and is delivered from the pump through the conduit 12 to the water inlet of the injector. Preferably, for reasons hereinafter explained, conduit 12 is provided with a check valve 14 which opens toward the injector as indicated and which is loaded by a relatively light load which may be furnished by a spring such as indicated at 16. Water is delivered to the boiler from the injector through the conduit 18 and the usual boiler check valve 20. Exhaust steam from the engine cylinder C is supplied to the injector through conduit 22 and overflow from the injector is carried to waste through conduit 24.

Live steam for operating the pump D is taken from the boiler turret 26 through the supply conduit 28 in which is located the main control valve F which is preferably situated at a convenient point in the cab B.

The flow of operating steam to the pump is controlled by a throttle valve 30 which may be of any suitable form and which in the present instance has been shown more or less diagrammatically as controlled from the engine cab by means of the operating hand wheel 32. Exhaust from the pump is carried either to waste or to any point where the heat of low pressure steam may be utilized, through conduit 34.

Preferably, for reasons to be hereinafter explained, the pump D is of the centrifugal or other rotary type although the invention in its broadest aspects is not limited to this specific type of pump. For purposes of illustration, I have indicated a centrifugal pump of known kind having a rotary impeller 36.

In order for the system to be able to supply preheated feed water to the boiler when the engine is not running and exhaust steam is not available, there is provided means for operating the injector E with live steam at reduced pressure hereinafter referred to as auxiliary steam. In the present embodiment, such steam is supplied to the injector through the branch live steam conduit 28a and the injector is further provided with an automatic changeover system operating in response to the presence or absence of exhaust steam to admit auxiliary live steam when such steam is needed and to shut off the supply of this steam when exhaust steam is available. To this end there is provided an exhaust steam valve indicated generally at G, an automatic changeover valve indicated at H and an exhaust steam pressure responsive diaphragm valve indicated at I. Valve G is connected to the live steam supply on the outlet side of the control valve F by means of conduit 38 which, in this instance, is shown connected to the branch conduit 28a. A conduit 40 connects a part of the valve I with the exhaust steam conduit 22, conduit 42 connects another part of this valve with the changeover valve H and still another part of the valve I is connected by means of conduit 44 with a zone of low pressure which in the embodiment shown is a part of the interior of the injector E.

Referring now more particularly to Figs. 2 to 5, the injector E comprises a body 46 providing a steam chamber 48 to which the exhaust steam is supplied from the conduit 22. A flap valve 50 opening into the chamber and pivoted at 52 serves to prevent reverse flow of steam from chamber 48 to the exhaust steam supply conduit when exhaust steam is not available and auxiliary live steam is being used. The main steam nozzle 54 and the water nozzle 56 are fixed in a suitable web 58 in the injector body which web forms a water chamber 60 surrounding the steam nozzle 54 and communicating with the nozzle 56. Chamber 60 is in communication with the delivery conduit 12 from the pump D.

The annular passage between nozzles 54 and 56 is relatively large in area and interposed in this passage between the nozzles there is a fixed annular ring 62, which as will be observed from Figs. 4 and 5, is provided with a series of peripherally spaced parallel slots 64, the passages through which form an outlet of constant area from the water chamber 60 to the interior of nozzle 56. A secondary steam nozzle 66 is slidably mounted in the injector body in alignment with the water nozzle and the space between nozzles 56 and 66 is placed in communication with the main steam chamber 48 of the injector by means of the passage 68 formed in the injector body. The injector is further provided with the usual combining tube 70 and delivery tube 72, the latter opening into the delivery chamber 74 which in turn communicates with the delivery conduit 18.

The injector has the usual overflow chamber 76 in communication with the overflow conduit 24. Communication between the overflow chamber and the overflow conduit is controlled in known manner by an overflow valve (not shown) which valve is loaded by delivery pressure in well-known manner through the medium of a plunger subjected to such pressure and applying a load to the delivery valve through a linkage indicated generally at 78 in Fig. 3. For details of construction of a typical example of loaded overflow valve apparatus of the kind just described, reference may be had to U. S. Patent No. 1,531,004 granted March 24, 1925, to Malcolm Hard and William A. Buckbee.

Referring again to the sliding secondary nozzle 66, the quantity of steam admitted to the injector through the secondary steam opening is controlled by the position of longitudinal movement of this nozzle in the casing and in the embodiment illustrated the position of this nozzle is determined by the position of rotation of the spindle 80 which has fixed thereto the eccentric pin 82 moving in a suitable transverse slot cut in the nozzle. At its upper end, spindle 82 has fixed thereto a lever 84, the end of which is interposed between a spring loaded plunger 86 mounted in the cylinder 88 fixed to the injector body, and a plunger 90 mounted in a cylinder 92 which is also fixed to the injector body. The interior of cylinder 92 is placed in communication with the pump delivery conduit 12 by means of pipe 94 in which pipe there is interposed the shut off valve or cock 96.

Considering now the automatic changeover system for supplying auxiliary steam when exhaust steam is not available, and referring more particularly to Figs. 1, 6 and 7, the construction of the changeover valve apparatus H is as follows. The high pressure live steam conduit 28a communicates with a chamber 98 in the injector body which is in turn in communication with chamber 100 by way of the port 102. A tapered plunger 104 extends into the port 102 to provide a port opening of variable area depending upon the position of the plunger. The upper end of the plunger is located in a cylinder 106 which is in communication with the chamber 98 by way of clearance space around the plunger and the plunger is urged toward its upper position giving maximum area of flow through port 102 by spring 108. Unbalanced steam pressure acting on the top of the plunger tends to move the plunger downwardly into port 102 against the resistance of spring 108.

A port 110 provides communication between the chamber 100 and passage 112 leading to the main steam chamber 48 of the injector. This port is controlled by a changeover valve member 114 having a valve head 116 at its lower end for closing the port and a piston 118 at its upper end which operates in a cylinder 120. A small passage 122 provides constant communication between the steam chamber 98 and the portion of cylinder 120 below piston 118 and a small leak port 124 provides for flow of a limited quantity of steam from the portion of the cylinder 120 below the piston to the portion above. The part of the cylinder above the piston is connected by the conduit 42 to the diaphragm valve I shown in Fig. 7. This valve comprises a casing indicated generally at 126, providing a diaphragm chamber in which is mounted a diaphragm 128 subjected to the pressure of exhaust steam from the exhaust conduit 22 and transmitted to the diaphragm through the connection 40. The diaphragm has attached thereto a valve member 130 movable under the influence of exhaust steam pressure to close communication between the conduit 42 and chamber 132 which is connected by conduit 44 to the low pressure steam chamber 48 of the injector. The spring 134 holds the valve member 130 in open position in the absence of exhaust steam pressure on the diaphragm of sufficient value to overcome the tension of the spring. This tension may be adjusted by means of the adjustment indicated generally at 136.

In the embodiment illustrated, the exhaust valve G consists of a double seated valve member 138 urged toward its seat by spring 140 and having connected thereto a piston 142 operating in a cylinder 144 which is placed in communication with the high pressure steam conduit 28a by the conduit 38. The live steam branch conduit 28a may be advantageously provided with a retarding valve indicated generally at 146, which may be of known construction and which, for the sake of simplicity, has been indicated more or less diagrammatically as a spring loaded check valve loaded by spring 148.

The operation of the apparatus is as follows, assuming the system to be started when the locomotive engine is running and exhaust steam is available.

The main control valve F is opened to admit operating steam to the throttle valve controlling pump D and this valve is opened by the control 32 to start operation of the pump. Water is forced by the pump past the check valve 14 to the water chamber 60 of the injector and through the openings 64 in the water nozzle 62. At the same time, the admission of steam to the supply branch 28a and conduit 38 causes piston 142 to open the valve member 138 of the exhaust valve G and exhaust steam opens the flap valve 50 and flows to nozzles 54 and 66. The mixture of steam and water overflows through the overflow conduit 24 (the overflow valve being unloaded because of lack of delivery pressure) until the jet is established and delivery commences. When this occurs, the overflow valve is loaded by delivery pressure through the loading mechanism including the linkage 78. The function of the retarding valve 146, if it is employed, is to delay the flow of steam to the exhaust valve operating piston sufficiently to permit water to reach the injector ahead of the exhaust steam. This facilitates rapidity of starting of the injector since the injector will commence operation more readily if it is flooded with water before steam is admitted.

The presence of exhaust steam in conduit 22 causes the diaphragm of valve I to keep the valve member 130 in closed position, thus preventing flow of steam through conduit 42 from the changeover valve cylinder 120. When the main control valve F is opened, steam flows through branch 28a to chamber 98 and through passage 122 to cylinder 120. Because of the port 124 through the piston 118, the pressure per unit of area on the two sides of the piston is equalized. Steam also flows through the choke port 102 and exerts pressure on the upper side of the valve head 116. Under these conditions, the combined pressures acting on the changeover valve member 114, due to the differences in areas exposed to the same steam pressure, keep this valve seated as shown in Fig. 6 and prevent the admission of auxiliary steam to the injector.

If it is now assumed that the engine ceases operation and it is desired to continue the feed to the boiler, the main control is allowed to remain open and auxiliary steam is admitted to the injector as follows. The failure of exhaust steam pressure permits spring 134 in the diaphragm valve to open the valve member so as to vent the connection 42 by way of chamber 132 and connection 44 to the low pressure steam chamber of the injector. If desired, the connection 44 may vent 42 directly to atmosphere or any other zone of low pressure. Failure of steam pressure above the piston 118 of the changeover valve, due to venting of connection 42, reverses the balance of forces acting on valve member 114 and the pressure of steam below the piston shifts this valve to open position, thus opening port 110. Live steam from chamber 100 then flows to the main steam chamber of the injector to replace the exhaust steam and as soon as flow commences the plunger 104, in cooperation with the port 102, acts as a throttling choke to reduce the pressure of the auxiliary steam flowing to the injector to a value approximating that of average exhaust steam pressure. Because of the fact that the boiler pressure may vary over comparatively wide limits, the area of the choke port is preferably made variable under the influence of variations in the pressure of the high pressure steam, so as to insure substantially constant auxiliary steam pressure, regardless of variations in boiler pressure.

It is believed that the reverse action of the changeover mechanism in shifting the injector back to exhaust steam operation when exhaust steam is again available, will be evident from the foregoing description.

In the embodiment of apparatus illustrated, the exhaust valve G is open at all times when the system is in operation and this valve is provided to prevent flow of exhaust steam through the injector and out the overflow when the engine is running and the feed heating system is not in operation.

The check valve 14 is provided in order to prevent flow of water through the pump and the overflow of the injector to waste when the system is not in operation and in the event that the injector is placed at a level on the locomotive which is below the level which may be attained by the water supply in the tender tank. It will, of course, be obvious that this check valve may be omitted if the injector is located at a place on the locomotive above the high water level of the tender tank and in this connection it may be pointed out that the usual manually controlled valve for shutting off the supply of water to an injector is not required with the present arrangement.

It will be understood that while in order to explain the nature of the invention a complete system involving numerous elements of construction has been shown, many of such elements and the specific arrangement thereof may be varied considerably without departing from the spirit or scope of the invention. For example, many changes may be made in the specific details of structure or arrangement of the control system for maintaining the injector in operation when exhaust steam is not available and within the scope of the invention certain features thereof may be used to the exclusion of others. For example, the control system for supplying the injector with auxiliary live steam may be omitted entirely if the conditions surrounding a particular installation are such that it is desirable to rely upon a simple live steam injector to feed to the boiler such quantities of water as may be required when steam is not being used by the main engine.

Those factors in the operation of the system which provide the improvements and advantages thereof will now be briefly pointed out.

Structurally the system presents many advantages with respect to application to locomotive boilers. Modern locomotives are of such large dimensions that substantially all of the clearance space through tunnels and the like is taken up by them and the large number of pieces of auxiliary apparatus carried by locomotives makes it increasingly difficult to find the space necessary to locate such equipment. In the present system, both of the major items of equipment are relatively small in size and due to the fact that they may be widely separated, it is possible to very easily mount them on a locomotive, as for example in the manner indicated in Fig. 1, with the pump at a low level near the tender end of the locomotive, in a position where advantage can be taken of gravity feed of the whole water supply to the pump, and with the injector mounted above the running gear of the locomotive and near to the engine cylinders so that a comparatively short length of exhaust steam piping to the injector can be used. Great flexibility in the matter of installation layout is thus possible which is of substantial practical importance in the application of the apparatus to locomotives of widely differing design. In this connection, it may be pointed out that the injector is of very much smaller bulk than a feed water heater and can be located in many places on a locomotive where it would be impossible to find the space necessary for the feed water heater.

It has been found from experience that it is impossible to deliver against the pressure of modern boilers with an exhaust steam injector operated entirely by exhaust steam. In order to utilize exhaust steam injector apparatus to pump against high boiler pressures, such injectors have heretofore been made as two stage injectors with a low pressure exhaust steam operated stage and a high pressure forcing stage operated by live steam or the necessary pumping power furnished by a supplementary jet of high pressure live steam operating in conjunction with the low pressure exhaust steam jet or jets. Both of these are relatively inefficient. In the former case, the high pressure injector stage is required to operate with water heated by the low pressure exhaust steam condensing stage and it is of course well known that hot suction water results in relatively poor injector operation and substantially reduces the capacity range of operation of an injector of given size. In the type of injector where combined jets are used, the heating effect of the high pressure steam jet is also present and reduces the amount of exhaust steam which can be condensed by a given amount of feed water. Such reduction of course reduces the effectiveness of the exhaust steam injector which is to condense the maximum amount of exhaust steam and return it to the boiler.

In a system embodying the present invention, these disadvantages and losses are eliminated since the required "boosting" pressure to enable the injector to feed to a high pressure boiler is provided by mechanical means which does not add heat to the water delivered to the injector. Furthermore, another advantage of great importance is provided by forcing the water under relatively high pressure to the injector. By supplying water at high pressure to the injector, it is possible to introduce the water thereto at the point where it meets the steam, with a velocity higher than is possible with an ordinary injector, so that the difference between the steam and water velocities is decreased. In the ordinary form of injector to which water is supplied under a relatively low pressure head, the flow of water through the water nozzle of the injector may be of the order of 30 to 50 feet per second whereas the steam may have entering velocity of from 1600 to 2,000 feet per second. This great difference in velocities introduces very high shock losses and we have found that the high velocity injection of water to an injector by means of a pump supplying water to the injector at high pressure results in the obtaining of a final delivery pressure considerably greater than the total of the delivery pressures obtainable by the use of the two devices separately. As an illustration of this, tests which we have made with an injector alone of the kind illustrated, supplied with water at 60° F. and exhaust steam at 1 pound gauge pressure, showed a delivery pressure of 146 pounds per square inch, with a delivery temperature of 160° F. When combined with a pump delivering water of the same temperature to the injector at 50 pounds pressure, the final delivery pressure attained was 225 pounds per square inch with exhaust steam being supplied to the injector at the same pressure as in the preceding test. Thus it is evident that of the 79 pounds increase in delivery pressure at least 29 pounds of such increase is due to the improvement in the injector action by the elimination of shock losses.

In accordance with the present invention, we propose to introduce water to the injector with high entering velocity by supplying it to the injector at high pressure. For locomotive boiler requirements, it is desirable that the system be able to deliver against a minimum back pressure of at least 300 pounds per square inch and to do this with water supplied to the system at an initial temperature which may be as high as 90° F. To do this, a booster pressure rising to a maximum value of the order of 300 pounds per square inch is contemplated. The high velocity of the entering water, when supplied in accordance with the present invention, introduces a serious practical difficulty if it is attempted with ordinary injector nozzle construction.

The high water velocity gives an injector having conventional nozzles of ordinary size a tremendous water capacity and for any reasonable injector capacity, nozzles of ordinary construction have to be placed so close together that the water passage is extremely small. The total cross sectional area for flow of entering water in an injector which may have a maximum capacity in excess of 40,000 pounds of water per hour may be of the order of not more than 10 to 15 hundredths of a square inch. This area is so small that with the usual annular nozzle, it is substantially impossible to keep the minute clearance between the nozzle walls from becoming clogged with the impurities which as a practical matter are always found in water as fed to locomotive boilers. Consequently we employ what may be said to be a shower nozzle through which the water flows in a plurality of separate streams. We have found by tests that the shower nozzle construction hereinbefore described is satisfactory and that reliable operation of the injector can be depended upon with this type of nozzle while at the same time obtaining good condensing results from the water introduced in this manner.

As previously pointed out, one of the principal functions of a feed heating system of the kind under discussion is to condense and return to the boiler the maximum quantity of exhaust steam. The quantity of exhaust steam that can be condensed and returned to the boiler in an injector is determined primarily by two factors one of which is the quantity of water which is being pumped to the boiler and the other of which is the temperature of the water as supplied to the injector.

It will be noted that in the construction of the injector, as shown in Fig. 2, that we provide for primary and secondary admission of exhaust steam. It will further be noted that in this construction the primary steam nozzle 54 is a diverging nozzle. This form of nozzle is most effective in producing the highest velocity of the steam at the point where it meets the entering water and it will be further noted that the water and the steam from the primary nozzle come together in nearly parallel lines of flow. This condition makes for the greatest effectiveness of the water forcing action of the jet. On the other hand, the secondary steam inlet through nozzle 66 has converging flow. Velocity of steam at this point is not so high nor is the steam directed into the jet at as advantageous an angle from the forcing standpoint. Consequently, this secondary jet may be regarded as being most effective as a heating jet for raising the temperature of the water. In order to take advantage of this, we advantageously vary the opening for secondary admission of steam so that the maximum quantity of steam will be condensed under any given set of operating conditions. Since the amount of steam which can be condensed is dependent upon the quantity of water being admitted to the injector, we arrange the sliding nozzle 56 in the manner already described so that the position of the nozzle is dependent upon the rate of feed of water to the injector. With a construction such as that shown, in which the area for flow of water to the injector through the shower nozzle is fixed, it will be evident that the pressure in the delivery conduit from the pump will vary with variations in capacity. The higher the capacity, the greater the pressure and vice versa. By reference to Figs. 2 and 3, it will be evident that as the pressure in the conduit 12 rises, the nozzle 66 will be moved to the right away from the nozzle 56 to enlarge the secondary steam opening and to admit through this opening larger quantities of steam.

We have found, however, that if the temperature of the water delivered to the injector exceeds approximately 70° F., that the condensing capacity of the injector is so impaired that it is not possible to enlarge the secondary steam opening without reducing the capacity range of the injector to an undesirable extent. In other words, with hot water the quantity of exhaust steam condensed can not be progressively increased with increase in the amount of water supplied and because of this the shut off valve 96 is provided in the pressure conduit 94 so as to permit the secondary steam inlet to be maintained in its minimum capacity position when desired. When applied to locomotive feed water heating systems, this regulation affords the possibility of increasing the delivery temperature of feed water by a substantial amount during the greater part of the year, it being usually only necessary to cut this secondary regulation out of action during a few summer months when the feed water from the locomotive tender is too warm to permit utilization of this regulation.

While regulation of the quantity of exhaust steam admitted in order to secure maximum feed water heating effect has been shown as accomplished solely through regulation of the secondary steam nozzle, it will be apparent that such regulation need not necessarily be limited to varying the area of only one of the two steam nozzles.

As previously mentioned, it is preferable to use a rotary pump for feeding water to the injector, but the use of a reciprocating pump is not impossible if a pump is employed which has substantially constant delivery pressure without pressure drops of large value between successive pump strokes. We have constructed and tested apparatus embodying the invention in which a reciprocating pump has been used and have found that the system will operate, but with pressure drop between successive pump strokes intermittent spilling of the injector takes place even though injector operation continues. Such spilling is of course undesirable. A relatively constant pressure which is easily obtained by a rotary pump, particularly a centrifugal pump, makes this form of pump most desirable. In order to secure the maximum benefit from apparatus embodying the invention, it is desirable to employ a relatively high delivery pressure from the pump, which pressure may conveniently be referred to as booster pressure. To obtain this pressure, live steam is used for operating the pump but the live steam used for the pump does not represent a net loss as compared with other exhaust steam injector systems since with other exhaust steam injector systems it is necessary, when feeding to high pressure boilers, to supplement the action of the exhaust steam with that of live steam which in prior systems has been introduced either to the same condensing zone of the injector as that to which exhaust steam is supplied or has been used to operate a separate high pressure injector stage to which water has been supplied by a low pressure exhaust steam stage. We have found that the improved injector action accompanying high booster pressure and high velocity of entry of the water due to such pressure results in net thermal gain if high booster pressure is used even though to obtain such high booster pressure requires the use of more live steam than would be required for a lower booster pressure.

In order to illustrate how we consider it best to secure maximum benefit from a system embodying the present invention, we give below the following example, which is to be taken as illustrative only, and not in any way limiting.

Let it be assumed that the boiler feeding system is to provide feed water for a boiler designed to operate at 300 pounds per square inch and that the desired capacity range of the system is from a minimum of 24000 pounds of water per hour to 40000 pounds of water per hour. Further, let it be assumed that the system must be capable of feeding water through a reasonable capacity range, which may not necessarily be the maximum capacity range, with water supplied to the system at a temperature as high as 90° F. Under these assumed conditions, the shower nozzle of the injector should be constructed with an area for flow of water which is of the order of 0.1228 square inch and the pump should be designed so that the booster pressure may be varied from a minimum of 107 pounds per square inch to a maximum of as high as 300 pounds per square inch for capacity operation of the injector. By having a pump capable of delivering against pressure of this order, it is possible to maintain relatively high capacity range and in the upper capacity range it is possible to continue to feed water to the boiler and to condense therewith sufficient exhaust steam to give a high delivery temperature, even when the water supply is at relatively high temperature.

To illustrate, in other words, what we consider it desirable to attain in a system embodying the invention, it may be said that the water nozzle construction and the pump providing the booster pressure should be so related that the velocity of entry of water to the condensing zone of the injector is maintained within a range of values of which the lower limit is of the order of 126 feet per second and in which the upper limit is of the order of 210 feet per second.

While in compliance with the patent statutes, we have illustrated one embodiment of apparatus suitable for carrying the invention into effect, it is to be understood that the scope of the invention is to be considered as embracing all variations in mode of operation and forms of apparatus employed which may fall within the scope of the appended claims when they are considered as broadly as is consistent with the state of the prior art.

We claim:

1. In a boiler feeding system, an exhaust steam injector, and a pump for supplying water under pressure to the injector, said injector having a water nozzle providing a plurality of passages disposed to introduce and direct the water supplied to the condensing zone of the injector at high velocity in a plurality of separate streams in the same general direction as that of the stream entering said condensing zone.

2. In a boiler feeding system, an exhaust steam injector having an annular main steam nozzle and a water nozzle surrounding a portion of the steam nozzle to provide between said nozzles an annular space for flow of the water supplied to the condensing zone of the injector, a water admission chamber, and means providing a plurality of separate passages disposed to introduce and direct the flow of water from said water chamber to said condensing zone through said space in the same direction as that of the steam delivered from said main steam nozzle.

3. In the operation of a boiler feeding system having an exhaust steam injector with a water inlet of fixed area and a pump for delivering water to said inlet, the improved method which consists in feeding water through said inlet at high velocity to the condensing zone of the injector, due to pressure from said pump, condensing with said water exhaust steam delivered at high velocity to establish a forcing jet raising the temperature of said jet by condensing therewith a secondary jet of exhaust steam, controlling the capacity of the system by varying the pressure at which water is delivered to the injector, and controlling the amount of steam supplied by said secondary jet in accordance with variations in pressure at which water is delivered to the injector.

4. In a boiler feeding system, the combination with a pump for delivering water at high pressure, of an exhaust steam injector having a water chamber in communication with the delivery of the pump, a main steam nozzle and a shower nozzle interposed between said water chamber and the delivery end of said steam nozzle for delivering water to the condensing zone of the injector at high velocity, said shower nozzle having a fixed cross sectional area determining the rate of flow of water to the combining zone of the injector, and means for varying the pump delivery pressure to control the rate at which water is delivered by the system.

5. In a boiler feeding system, the combination with a pump for delivering water at high pressure, of an exhaust steam injector receiving water from said pump, said injector having a main steam nozzle, a water chamber around said nozzle and in communication with the pump, means cooperating with the outlet end of said nozzle to form an annular passage for flow of water into contact with steam emerging from said nozzle, means fixed in the injector around the nozzle between said water chamber and outlet end of the nozzle having a plurality of slots therethrough formed and disposed to direct the flow of water at high velocity in a plurality of separate streams into said annular passage in the same general direction as that of the steam delivered from said nozzle, the total cross sectional area of said slots being less than the cross sectional area of said annular passage, and means for varying the delivery pressure of the pump to control the rate at which water is delivered by the system.

6. In a boiler feeding system, an exhaust steam injector of the forcing type adapted to deliver water at substantially higher pressure than that at which water is admitted to the injector, said injector having a water nozzle of fixed cross sectional area, a conduit connecting the delivery end of the injector with a boiler, means for supplying the injector with exhaust steam from an engine and with low pressure live steam from the boiler when exhaust steam is not available, and means for supplying water to the injector at different rates and at different pressures in accordance with the requirements of the boiler for feed water.

7. In a boiler feeding system, a mechanical pump, a conduit for supplying to the pump boiler feed water from a source external of the boiler, an exhaust steam injector of the forcing type separate from the pump and having steam and water nozzles and an overflow, a conduit for supplying water from the pump to the water nozzle of the injector at a pressure substantially above exhaust steam pressure but below boiler pressure, a conduit for supplying exhaust steam from an engine to a steam nozzle of the injector and a conduit for delivering water from the injector to the boiler.

8. In a boiler feeding system, a mechanical pump, a conduit for supplying to the pump boiler feed water from a source external of the boiler, an exhaust steam injector of the forcing type separate from the pump and having steam and water nozzles and an overflow, a conduit for supplying water under pressure from the pump to the water nozzle of the injector at a pressure substantially above exhaust steam pressure but below boiler pressure, a conduit for supplying exhaust steam from an engine to a steam nozzle of the injector, means for delivering low pressure live steam to the injector for operating the same when exhaust steam is not available and a conduit for delivering water from the injector to the boiler.

9. In a boiler feeding system, an exhaust steam injector having a water nozzle, a main steam nozzle and a secondary steam nozzle, a pump for supplying water under pressure to the water nozzle, means for supplying exhaust steam from an engine to said steam nozzles and means responsive to variations in the rate at which water is supplied by said pump for varying the area of the opening of the secondary steam nozzle.

10. In a boiler feeding system, an exhaust injector of the forcing type having a water nozzle of fixed area, a main steam nozzle and a secondary steam nozzle, a pump for supplying boiler feed water under pressure to said water nozzle, means for controlling the rate of operation of said pump to regulate the amount of feed water supplied to the boiler, means for supplying exhaust steam from an engine to said steam nozzles and pressure responsive means for varying the area of the opening of said secondary steam nozzle in response to variations in the pressure at which water is supplied to the water nozzle by said pump.

11. In a boiler feeding system, a mechanical feed water pump, means for supplying said pump with feed water from a source external of the boiler, an exhaust steam injector of the forcing type, means for supplying said injector with exhaust steam from an engine, means for conducting feed water under pressure from the delivery side of said pump to said injector, means for controlling the rate at which water is delivered by said pump to regulate the supply of feed water to the boiler, means responsive to the rate at which feed water is supplied by the pump to the injector for automatically regulating the supply of exhaust steam to the injector and means for conducting the water delivered by the injector to the boiler.

12. In a boiler feeding system, an exhaust steam injector of the forcing type having a water nozzle of fixed cross-sectional area, said injector being connected to deliver feed water to the boiler, a mechanical pump, means for supplying said pump with cold feed water from a pressure free source of supply, said pump delivering unheated feed water to said nozzle at a pressure substantially above atmospheric but materially below boiler pressure, and means for controlling the speed of operation of said pump for regulating the quantity of feed water supplied to the boiler by said injector.

13. In the operation of a boiler feeding system having an exhaust steam injector of the forcing type delivering water to the boiler, the improved method which consists in elevating the pressure of cold boiler feed water from a pressure free source without materially increasing the temperature of the water, forcing the feed water at its elevated pressure at high velocity to the condensing zone of the injector through a plurality of openings of fixed cross-sectional area, and controlling the capacity of the injector by varying the pressure at which the water is supplied to such openings.

14. In a boiler feeding system, an exhaust steam injector of the forcing type having a water inlet of fixed area, means for feeding water through said inlet at high velocity to the condensing zone of the injector comprising a pump for delivering water to said inlet under a substantial pressure, said injector having means for condensing a first exhaust steam supply with the water delivered at high velocity to the injector to establish a forcing jet and means for condensing a secondary exhaust steam supply to elevate the temperature of said jet, and means for varying the pressure at which water is delivered to said inlet to control the capacity of said injector.

15. In a boiler feeding system, an exhaust steam injector of the forcing type having a water inlet of fixed area, means for delivering cold feed water to said inlet at high velocity comprising a mechanical feed water pump for delivering unheated feed water to said inlet under substantial pressure, said injector including means for condensing a first exhaust steam supply with the water delivered at high velocity to the injector to establish a forcing jet and means for condensing a secondary exhaust steam supply to increase the temperature of said jet, means for controlling the pressure at which water is delivered to the injector to regulate the capacity of the system, and means for controlling the amount of said secondary supply of steam in accordance with variations in pressure at which the water is delivered by the pump to the injector.

RUDOLF M. OSTERMANN.
ARTHUR WILLIAMS.